Jan. 4, 1944.        K. SCHMITT        2,338,460
ELECTRICAL DISTRIBUTION SYSTEM FOR VEHICLES
Filed April 13, 1940
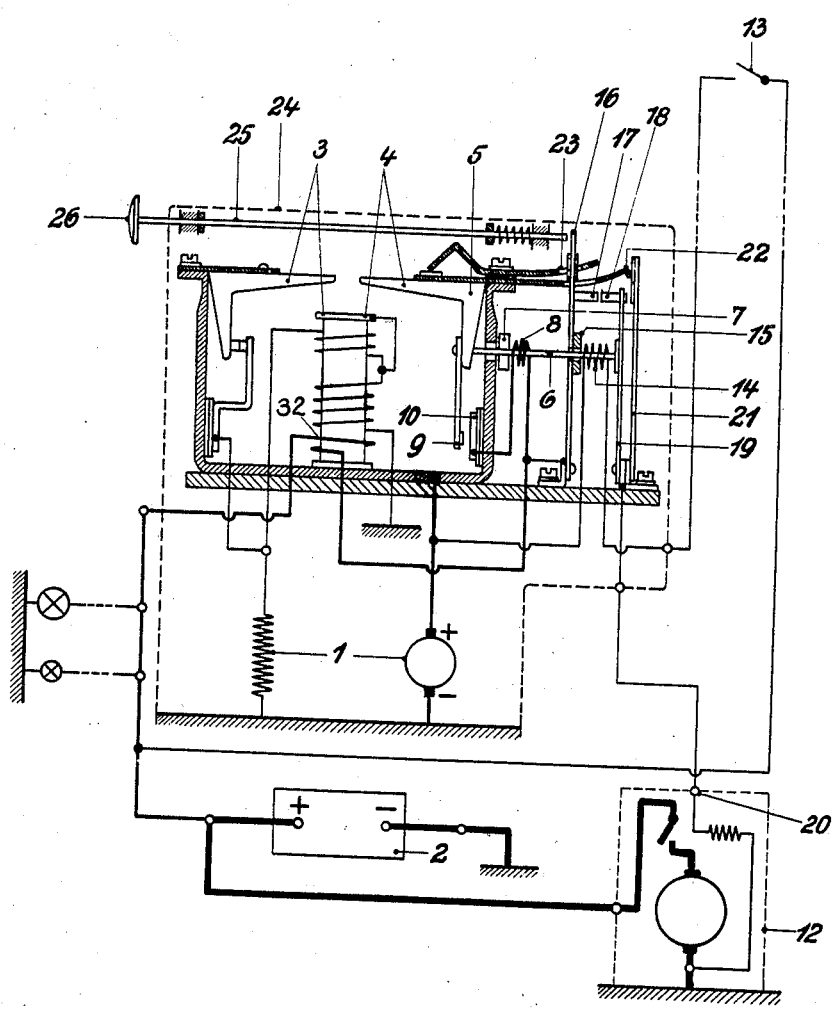
Inventor
KARL SCHMITT
By
Attorneys Patented Jan. 4, 1944

2,338,460

UNITED STATES PATENT OFFICE 2,338,460

ELECTRICAL DISTRIBUTION SYSTEM FOR VEHICLES

Karl Schmitt, Stuttgart-Degerloch, Germany; vested in the Alien Property Custodian Application April 13, 1940, Serial No. 329,575
In Germany March 9, 1939

7 Claims. (Cl. 290—37)

This invention relates to an electrical distribution system for vehicles, and more particularly to the control of the starting motor and generator in such a system.

An object of this invention is to provide a simple system for actuating the starting motor of a vehicle engine.

Another object of this invention is to eliminate a long special conductor for the starting switch of a starting motor for a vehicle engine.

Still another object of this invention is to provide a system wherein the connections for starting the starting motor of a vehicle engine are automatically broken when the voltage of the generator equals that of the battery.

A further object of this invention is to provide combined interlocked reverse current relay and motor starting switch for a vehicle distribution system.

A still further object of this invention is in providing an arrangement whereby the motor for starting a vehicle engine may be started in the simplest possible manner from the instrument panel and also by a switch in the vicinity of the engine itself.

With these and incidental objects in view, the invention consists in certain novel features of construction and combination of parts which are set forth in the appended claims and a preferred form of embodiment whereof is hereinafter described with reference to the drawing which accompanies and forms part of the specification, wherein:

The single figure shows a circuit diagram of the vehicle distribution system in accordance with this invention, and its relationship to an improved combined voltage regulator, reverse current relay and motor starting switch, drawn to an enlarged scale.

The vehicle is provided with the usual generator 1, generally mounted upon the engine in some suitable manner, and the main power source consisting of the storage battery 2. The generator 1 may be provided with a voltage regulator 3 and interconnected with the battery 2 through a reverse current relay 4, both of these devices being arranged to be influenced by the magnetization of a common core provided with suitable control winding. The armature 5 of the reverse current relay is interconnected with a holding armature 7 by means of a shaft 6, the holding armature 7 being influenced by a current coil 8 so that when the contacts 9, 10 of the reverse current relay are closed, they cannot be opened by vibration.

To control the engine starting motor 12 there is provided a starting switch 13 which may be mounted on the instrument panel. Closure of the switch 13 connects the coil 14 of a starting switch between the positive poles of the generator 1 and the battery 2. Accordingly, when the engine is started and the generator 1 is producing no appreciable voltage, the voltage difference between the battery and generator will energize the coil 14 and attract the armature 15 mounted on a spring member 16 to close contacts 17 and 18. Upon closure of the contacts 17 and 18 an energizing circuit for the starting motor control may then be traced from the positive side of the battery 2, the current coil 32 of the combined voltage regulator and reverse current relay, the spring arm 16, contact 17, contact 18, spring arm 19 and then to the terminal 20 of the starting motor 12.

Since upon closure of the switch 13, the coil 14 of the motor starting switch is interconnected between the positive poles of the generator 1 and the battery 2, this coil 14 will remain energized to keep contacts 17 and 18 closed, while there is a potential difference between the generator 1 and the battery 2. However, as soon as the engine starts and the generator 1 is developing full voltage, there will be no potential difference between the generator and the battery and the coil 14 will become de-energized, despite the fact that the switch 13 may still be closed. Such being the case the armature 15 will be released, thereby opening contacts 17 and 18 and breaking the starting circuit for the starting motor. Thus the energization of the starting motor 12 is automatically removed when the motor is no longer needed.

When the generator 1 has attained the proper voltage, the reverse current relay 4 will also operate to close its contacts 9, 10 and through the holding armature 7 and the current coil 8, the relay will be held in this position so long as current flows from the generator to the battery. The shaft 6 upon which the holding armature 7 is mounted, is preferably extended to press against the spring arm 19 of the motor starting switch and in such a manner that movement in the contact-closing direction of the armature 5 will, through the shaft 6, move the contact 18 of the starting switch away from the contact 17. Since the shaft 6 passes through an opening in the spring 16, the contact 17 will remain unaffected. Preferably suitable insulating means will be provided in the shaft 6 to prevent any current flow between the armature 5 and the spring arm 19. In this manner it is impossible to close contacts 17 and 18 while the engine is running. Additionally, the force of the spring arm 19 against the armature 5 also affects the operation of the reverse current relay so that this relay will open upon lower voltages of the generator 1. This effect is enhanced by the provision of a supplemental spring arm 21 which serves as an abutment for the spring arm 19 after it has been moved by the armature 5. Through the two spring arms 19 and 21, a progressive springing effect is produced upon the armature 5 and may be so designed that the return force upon the armature 5 will be sufficiently great for opening of the contacts 9, 10 when the generator is producing the low voltage occurring during idling of the driving engine. The forward position of the spring 21 can be adjusted by the deformable abutment 22 so that the resultant springing effect can be varied as desired. Movement of the spring arm 19 can also be varied by the use of a deformable limiting abutment 23.

For the purposes of testing and examining the engine, it is often desirable that means be provided for starting the engine at some point in the vicinity of the engine itself. Since the voltage regulator, reverse current relay and starting switch are generally mounted near the engine, I have provided such a supplemental starting switch in connection with these devices. For this purpose, the voltage regulator and control switches may be mounted within a casing member, indicated at 24, into which extends a rod 25 operable by a pressure knob 26. The end of the rod 25 is positioned so as to be movable against the end of the spring arm 16 carrying the contact 17 and pressing the same against the contact 18. In this manner, the starting switch may be directly actuated. A suitable spring means of any character has been shown as normally maintaining the rod 25 out of contact with the spring arm 16. The casing 24 protects the entire apparatus from dirt and dust while at the same time confining any sparking action which may take place at the switches.

From the invention described above, it will be realized that I have provided an arrangement which fulfills all of the objects primarily stated. In place of circuits which require two sets of leads, one for the battery charging indicator and another for the starting switch, it is only necessary in the above described arrangement to provide one pair of leads for both. Additionally, since the current through these leads will be relatively small as compared to arrangements whereby the full starting motor current passes through the main starting switch, the leads themselves may be much smaller and accordingly much less expensive.

Furthermore, by means of the proposed arrangement, the energization of the starting motor is immediately cut out when not needed, while also the starting motor may be energized through a supplemental switch, when it is not convenient to close the ordinary starting switch on the instrument board.

The provision of a voltage regulator in the above described construction is purely optional and this may be eliminated if desired. Furthermore, the actuating coil of the motor starting switch may be placed upon the same core as the coil of the reverse current switch and of the voltage regulator provided the armature of the magnetic switch is properly polarized. This variation in construction will be at once apparent to those skilled in this art.

It will be seen therefore that I have provided an arrangement which fulfills the objects and while I have shown a single embodiment of my invention, it is clear that other forms thereof may readily be provided without departing from my invention as defined in the following claims.

I claim:

1. In an electrical system for power vehicles, in combination, a battery, a generator, an engine-starting motor, a switching device having an actuating coil and a pair of normally open contacts adapted to be closed upon energization of said coil, means for connecting said motor to said battery upon closure of said contacts, a switch for serially connecting said coil between the positive poles of said battery and generator, a reverse-current relay connected intermediate said battery and generator, and means responsive to energization of said reverse current relay for maintaining the contacts of said switching device open despite energization of its actuating coil.

2. The combination in an engine-driven vehicle having a battery charging system consisting of an engine-driven generator and a storage battery, and a starting motor for the engine adapted to draw power from said battery, of a switch comprising a pair of spaced spring arms supporting normally open juxtaposed contact members, an armature on one of said spring arms, a first coil adapted to attract said armature and move said one spring arm toward the other to close said contacts, a second armature interconnected with the other spring arm, a second coil responsive to the voltage of said generator, adapted to attract said second armature and move said other spring arm away from the one spring arm to prevent closing of said contacts despite energization of said first coil, means for connecting said motor to said battery upon closure of said contacts, and switch means interconnecting said first coil between the positive poles of said battery and generator.

3. The combination according to claim 2, in combination with a spring abutment spaced from but in the path of movement of said other spring arms for progressively increasing the return force on said other spring arm after a predetermined movement thereof by said second coil.

4. The combination according to claim 2, in combination with a spring abutment spaced from but in the path of movement of said other spring arms for progressively increasing the return force on said other spring arm after a predetermined movement thereof by said second coil, and means for adjusting the tension of said spring abutment.

5. The combination in an engine-driven vehicle having a battery charging system consisting of an engine-driven generator and a storage battery, and a starting motor for the engine adapted to draw power from said battery, of a switch having a pair of normally spaced contacts, means for connecting said motor to said battery upon closure of said contacts, an armature, an actuating coil for moving said armature and closing said spaced contacts, switch means for interconnecting said coil between the positive poles of said generator and battery, a reverse-current relay including an armature, actuating coils including a voltage coil responsive to the voltage of said generator and a current coil responsive to the current flow from said generator to said battery, a pair of normally open contacts adapted to be closed by said armature upon energization of said coils, means serially connecting said relay contacts with said current coil intermediate the generator and battery, and means interconnecting the armature of said relay with one of the contacts of said switch for moving said contact away from its cooperating contact upon closure of said relay contacts irrespective of the energization of the actuating coil of the switch.

6. The combination according to claim 5, in combination with progressively acting spring means for resisting movement of the relay armature by said relay coils.

7. The combination according to claim 5, in combination with progressively acting spring means for resisting movement of the relay armature by said relay coils, and means for adjusting the tension of said spring means.

KARL SCHMITT.